(12) United States Patent
Bade et al.

(10) Patent No.: US 8,435,330 B2
(45) Date of Patent: May 7, 2013

(54) CARBON CAPTURE SYSTEM AND PROCESS

(75) Inventors: Otto M. Bade, Stabekk (NO); Charles D. Soothill, Mountsorrel (GB)

(73) Assignee: ALSTOM Technology Ltd, Baden (CH)

( * ) Notice: Subject to any disclaimer, the term of this patent is extended or adjusted under 35 U.S.C. 154(b) by 324 days.

(21) Appl. No.: 12/740,544

(22) PCT Filed: Oct. 30, 2008

(86) PCT No.: PCT/GB2008/003668
§ 371 (c)(1),
(2), (4) Date: Jul. 28, 2010

(87) PCT Pub. No.: WO2009/056830
PCT Pub. Date: May 7, 2009

(65) Prior Publication Data
US 2010/0294131 A1 Nov. 25, 2010

(30) Foreign Application Priority Data
Nov. 1, 2007 (GB) ................................... 0721488.5
Nov. 15, 2007 (GB) ................................... 0722431.4

(51) Int. Cl.
*B01D 47/00* (2006.01)

(52) U.S. Cl.
USPC .................... 95/199; 95/209; 95/223; 95/227; 95/228; 95/236

(58) Field of Classification Search ............. 95/199, 95/223, 227, 229, 232, 235, 236; 423/220, 423/234, 243.01, 243.06
See application file for complete search history.

(56) References Cited

U.S. PATENT DOCUMENTS

| 1,897,725 A | 2/1933 | Gaus et al. |
| 7,867,322 B2 * | 1/2011 | Gal ................................ 95/199 |
| 2008/0178733 A1 | 7/2008 | Gal |

FOREIGN PATENT DOCUMENTS

| JP | 60 238121 | 11/1985 |
| JP | 06-327936 | 11/1994 |
| JP | 155262/96 | 6/1996 |
| JP | 2005087932 | 4/2005 |
| JP | 2006-266983 | 10/2006 |
| JP | 2006-282403 | 10/2006 |
| JP | 62 121663 | 2/2007 |
| WO | 2004/052511 | 6/2004 |
| WO | WO 2006/022885 | 3/2006 |
| WO | WO 2007/012143 | 2/2007 |
| WO | WO 2007/068733 | 6/2007 |

OTHER PUBLICATIONS

Japanese Office Action dated Oct. 14, 2011.
PCT International Search Report and The Written Opinion of the International Searching Authority dated Jun. 3, 2009—(PCT/GB2008/003668).
Official Action from the Patent Office of the Russian Federation, dated Sep. 19, 2012.

* cited by examiner

*Primary Examiner* — Robert A Hopkins
(74) *Attorney, Agent, or Firm* — Robert D. Crawford

(57) ABSTRACT

A system and process is provided primarily for use in hot climates, using ammonia solution to remove carbon dioxide from desulphurised water-vapor-containing flue gases of a fossil fuel power plant, while outputting useful streams of water and fertilizer.

13 Claims, 1 Drawing Sheet

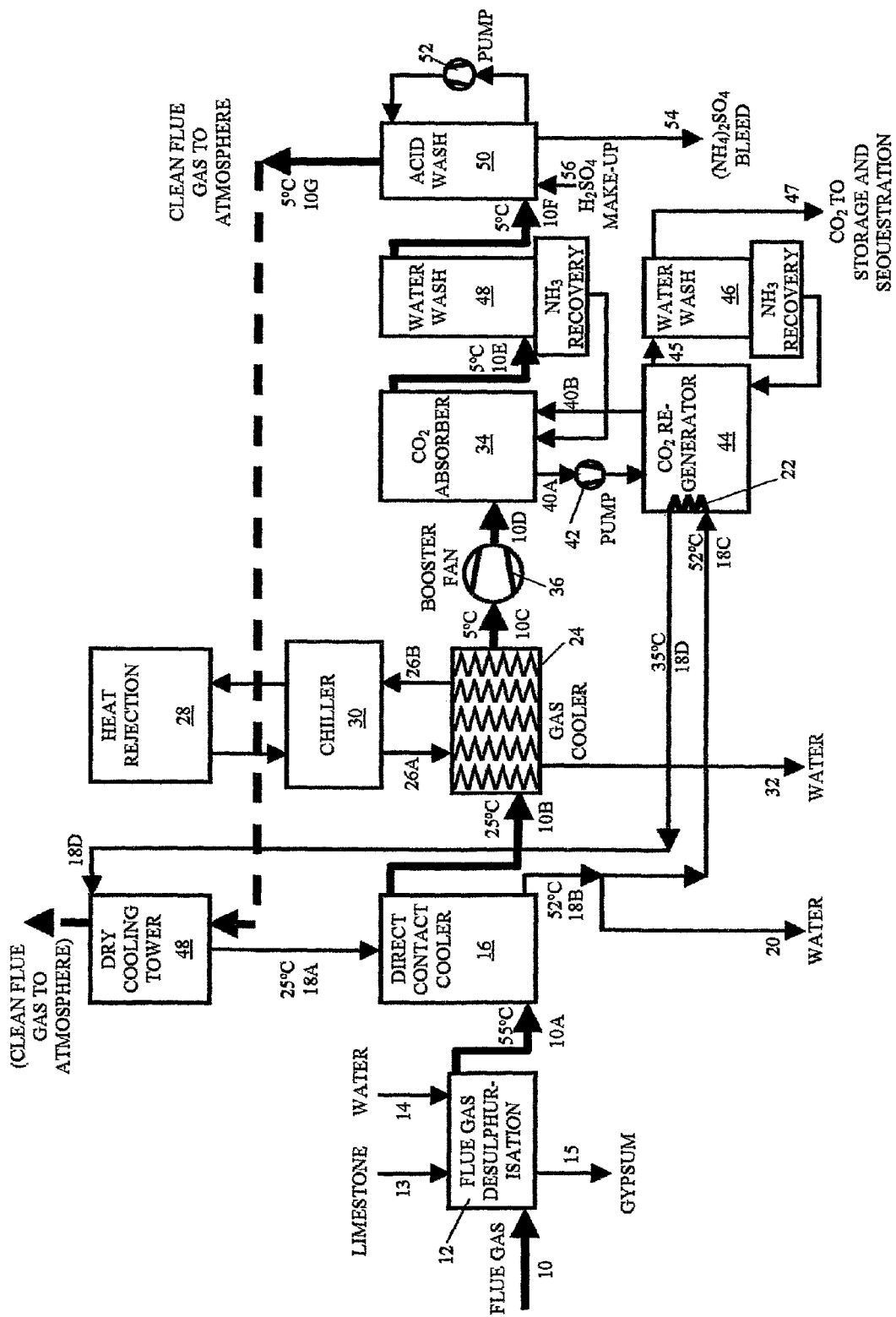

CARBON CAPTURE SYSTEM AND PROCESS

FIELD OF THE INVENTION

The present invention relates to the field of climate protection technology, and in particular to improving the process of carbon capture in fossil fuel power plants using a system in which carbon dioxide is absorbed from the power plant's flue gases by an ammonia-based solution or slurry.

BACKGROUND OF THE INVENTION

Fossil fuel power plants can be fitted with carbon dioxide ($CO_2$) capture equipment either when first built or as a retrofit. One technology that shows near-term promise for large-scale practical application comprises processes in which ammonia-rich solutions and slurries are used to absorb $CO_2$ from power station flue gases.

For example, published International patent application no. WO 2006/022885 A1 (E. Gal) describes a process of the chilled ammonia type, in which downstream of conventional pollution control equipment, such as electrostatic precipitators and flue gas desulphurisers, the flue gases are cooled to well below ambient saturation temperature and subject to wet scrubbing with cold water to remove residual contaminants not removed by the conventional equipment. This is followed by passage of the cleaned flue gases through one or more $CO_2$ absorbers operating at about atmospheric pressure and at a low temperature in the range 0° C. to 20° C., where the gaseous $CO_2$ in the flue gases is reacted with an ammoniated solution. Cooling of the flue gas before passage through the $CO_2$ absorber reduces its moisture content and its volume, thereby increasing the $CO_2$ concentration and making its capture more efficient. Moreover, the relatively low scrubbing temperature in the absorber enhances mass transfer of $CO_2$ to the ammonia solution while reducing the ammonia's vapour pressure, so tending to prevent its evaporation into the flue gas stream. The $CO_2$-rich ammonia solution from the absorber vessel is then pressurised and heated to release the absorbed $CO_2$ as a relatively clean pressurised $CO_2$ gas stream containing low concentrations of ammonia, the latter being recovered by a further cold scrubbing process. The ammonia solution is now $CO_2$-lean, and is re-circulated for further $CO_2$ absorption duty. Meanwhile, the $CO_2$ gas stream can be cooled and further pressurised for storage and sequestration. The reader is referred to the above-mentioned patent publication for a more complete description of the process.

Carbon capture processes are of course intended to slow down the onset of climate change caused by increased concentrations of greenhouse gases in the atmosphere. However, most climate specialists agree that some global warming is already occurring and will continue for several decades, at least. The results of global warming-driven climate change will include increased aridity in some regions of the world, with concomitant water shortages. Additionally, there will be an increased need for fertilisers to boost crop yields.

SUMMARY OF THE INVENTION

Accordingly, the present invention provides a system that removes carbon dioxide from desulphurised water-vapour-containing flue gases of a fossil fuel power plant, while outputting streams of fertiliser and water. The system comprises:
(a) a first flue gas cooling stage, including water cooling means and a first flue gas cooler connected to receive cooled recirculated water from the water cooling means to cool the flue gases and thereby condense water therefrom;
(b) a second flue gas cooling stage, including coolant cooling means connected in a closed circuit to a second flue gas cooler, whereby the second flue gas cooler receives recirculated coolant from the coolant cooling means to further cool the flue gases and thereby condense further water therefrom;
(c) bleed means by which respective water streams at least equal to the amounts condensed from the first and second flue gas cooling stages are separately removed from the system for further use;
(d) a carbon dioxide absorbing stage that uses a recirculated ammonia-rich solution to absorb carbon dioxide from the cooled de-watered flue gases and output a stream of carbon dioxide depleted flue gas including entrained ammonia;
(e) a carbon dioxide regenerating stage that receives the carbon dioxide containing ammonia-rich solution from the carbon dioxide absorbing stage, outputs a stream of carbon dioxide including entrained ammonia by heating the ammonia-rich solution to liberate the absorbed carbon dioxide therefrom, and recirculates carbon-dioxide depleted ammonia-rich solution to the carbon dioxide absorbing stage;
(f) means removing the carbon dioxide stream from the system for long term storage;
(g) a sulphuric acid wash stage that receives the stream of carbon dioxide depleted flue gas from the carbon dioxide absorbing stage, removes ammonia therefrom by reaction of the ammonia with the sulphuric acid to produce concentrated ammonium sulphate solution, and outputs a stream of clean carbon dioxide depleted flue gas;
(h) bleed means by which a stream of the concentrated ammonium sulphate solution is removed from the system for further use; and
(i) means receiving the clean flue gas from the sulphuric acid wash stage and passing it to atmosphere.

It may be necessary or desirable for a water wash stage to be located between the carbon dioxide absorbing stage and the sulphuric acid wash stage to recover an initial proportion of ammonia from the stream of carbon dioxide depleted flue gas, the recovered ammonia being recycled to the ammoniated solution in the carbon dioxide absorbing stage. A water wash stage may also be located after the carbon dioxide regenerating stage to recover ammonia from the stream of carbon dioxide before the carbon dioxide is removed from the system for long-term storage, the recovered ammonia being recycled to the ammoniated solution in the carbon dioxide regenerating stage.

Preferably, the first flue gas cooler is a direct contact gas cooler. Advantageously, the recirculated water that has been heated by the flue gases in the first flue gas cooler is passed through a heat exchanger in the carbon dioxide regenerating stage, thereby to heat the carbon dioxide containing ammonia-rich solution and liberate the absorbed carbon dioxide therefrom. After passing through the carbon dioxide regenerating stage, the recirculated water is passed through the water cooling means in the first flue gas cooling stage.

The water cooling means in the first flue gas cooling stage should cool the recirculated water by a method that does not result in loss of the recirculated water by evaporation. Thus, the water cooling means in the first flue gas cooling stage may be a heat exchanger that puts the recirculated water in a non-contact heat exchange relationship with either the clean flue gas stream output by the sulphuric acid wash stage before the clean flue gas stream is passed to atmosphere, or an environmental coolant, such as seawater or ambient air. For example, the water cooling means may be a dry cooling tower that uses the clean flue gas stream or ambient air to cool the recirculated water. As a further alternative, the water cooling means in the first flue gas cooling stage may be an absorption chiller that is energised by heat from the power plant and is operative to cool the recirculated water and reject the heat so gained to the environment.

Putting the recirculated water in a non-contact heat exchange relationship with the clean flue gas stream before the latter is passed to atmosphere is particularly advantageous because it avoids heating of environmental coolants and because heating of the clean flue gas stream after the sulphuric acid wash stage will aid exhaust plume dispersal.

Whereas the first flue gas cooler is preferably a direct contact gas cooler, the second flue gas cooler is a form of heat exchanger in which the coolant does not directly contact the flue gas stream. Hence, the second flue gas cooler may comprise an array of heat exchange coils through which the recirculated coolant is passed.

The coolant cooling means in the second flue gas cooling stage may be a mechanical chiller in which the coolant is a refrigerant (such as ammonia, $CO_2$, or Freon®) that is evaporated by heat exchange with the flue gases and condensed by heat exchange with an environmental coolant, such as seawater or ambient air. Alternatively, the coolant cooling means may be an absorption chiller that is energised by heat from the power plant and is operative to cool recirculated water or other coolant that has been heated by the flue gases and to reject the heat so gained to the environment.

The invention also provides a process for removing carbon dioxide from desulphurised water-vapour-containing flue gases of a fossil fuel power plant. The process comprises the steps of:
(a) cooling the flue gases and condensing water therefrom in a first flue gas cooling stage;
(b) further cooling the flue gases and condensing further water therefrom in a second flue gas cooling stage;
(c) bleeding water separately from the first and second flue gas cooling stages in respective water streams whose flow rates are at least equivalent to the respective amounts condensed from the first and second flue gas cooling stages;
(d) absorbing carbon dioxide from the cooled de-watered flue gases in an ammonia-rich solution and outputting a stream of carbon dioxide depleted flue gas including entrained ammonia;
(e) heating the ammonia-rich solution and outputting a stream of liberated carbon dioxide including entrained ammonia;
(f) recirculating carbon-dioxide depleted ammonia-rich solution for use in further carbon dioxide absorption;
(g) removing the carbon dioxide stream from the process for long term storage;
(h) removing entrained ammonia from the stream of carbon dioxide depleted flue gas by scrubbing it in a sulphuric acid wash stage and outputting a stream of clean carbon dioxide depleted flue gas while simultaneously producing concentrated ammonium sulphate solution by combination of the ammonia with the sulphuric acid;
(i) bleeding a stream of the concentrated ammonium sulphate solution from the sulphuric acid wash stage for further use; and
(j) passing the clean flue gas to atmosphere.

Preferably, the fossil fuel power plant is a gas turbine combined cycle power plant burning gasified coal or oil.

Further aspects of the invention will be apparent from a perusal of the following description and claims.

BRIEF DESCRIPTION OF THE DRAWING

Exemplary embodiments of the invention will now be described with reference to the accompanying FIG. 1, which is a flow diagram illustrating in simplified form a process for removing, inter alia, carbon dioxide from flue gases.

DETAILED DESCRIPTION OF THE PREFERRED EMBODIMENTS

A power plant burning natural gas produces a relatively clean flue gas stream, containing only about 2-3% $CO_2$. On the other hand, a power plant burning fuels such as coal and oil, produces flue gases that contain (among other things) about 10-15% $CO_2$. World-wide, the majority of power stations already built, or which are planned to be built in the near to mid-term, are coal-fired in some form or other. It will therefore be appreciated that reducing their $CO_2$ emissions has a very important role to play in reducing the impact of climate change.

Although desulphurisation of power plant flue gases is not an object of the present invention, it is assumed at the left hand end of FIG. 1 that the flue gas stream 10 requires desulphurisation. After passing through an electrostatic precipitator (if necessary, not shown), which removes any suspended particulates and sulphurous/sulphuric acid mist, flue gas 10 enters a desulphurisation process 12. In the present case, a wet scrubbing process is assumed, in which crushed limestone (calcium carbonate) 13 is mixed with low quality water 14 (e.g., seawater) to produce a limestone slurry spray through which the flue gas 10 is passed. A reaction occurs in which sulphur dioxide in the flue gas is converted to calcium sulphite and carbon dioxide. The calcium sulphite is then oxidised to hydrated calcium sulphate (gypsum) 15, which can be sold as a building material.

The Wellman-Lord process is an alternative desulphurisation process that could be considered for use with the present invention. Firstly, the hot flue gases are scrubbed to remove ash, hydrogen chloride, hydrogen fluoride and sulphur trioxide. After cooling, the gases are sprayed with a saturated solution of sodium sulphite in an absorption tower. The sodium sulphite reacts with the sulphur dioxide to form a concentrated sodium bisulphite solution, which is passed to an evaporation system for regeneration, where it is broken down by a steam treatment to release the sodium sulphite for recycling. The released sulphur dioxide is converted to elemental sulphur, sulphuric acid or liquid sulphur dioxide. A main advantage of this process is that the sorbent is regenerated during the process and is continuously recycled. Furthermore, when used with a power plant that raises steam for power generation, the power plant may provide a source of steam for use in the process.

A further alternative that could be considered for use with the present invention is to remove sulphur from coal during the burning process in the power plant. This can be done by using either pressurised fluidised bed combustors, or the Integrated Gasification Combined Cycle process. In this case, flue gas desulphurisation as shown in FIG. 1 would be unnecessary.

For the purposes of describing embodiments of the invention with reference to FIG. 1, it will be assumed that the flue gas 10A, no matter how it has been desulphurised, originates from a gas turbine combined cycle (GTCC) power plant burning gasified coal or oil, and therefore contains about 10-15% $CO_2$. In addition to $CO_2$ and other atmospheric gases, the desulphurised flue gas 10A contains only residual contaminants and is water saturated with about 15-18% water at a temperature of 40-70° C., typically about 55° C. To purge the residual contaminants and cool the flue gas 10A, it is passed through a first flue gas cooling stage comprising a direct contact gas cooler (DCC) 16, where relatively cool water 18A at about ambient temperature (say, 25° C.) is used to wash the flue gas in a counter-current flow, packed-bed vessel. Consequently, the flue gas is cooled to about ambient temperature and excess water condenses out. Assuming the flue gas stream 10A is acceptably clean, the water in the DCC 16 (which is recirculated via the $CO_2$ regenerator 44, as explained later), will also be acceptably clean. The condensed water mixes with the washing water 18A to form a lightly contaminated water stream 18B, which exits the DCC 16 at a temperature of about 52° C. The raised temperature of stream 18B results from the combined effect of heat of condensation and heat transfer from the flue gas. Note that a stream of water 20, at least equivalent to the amount of water condensed out of the flue gas 14, is shown as being bled off the main stream 18B at the outlet of the DCC 16. After purification as necessary, e.g., in ion exchange resin or a solar still, the water 20 will be potable, or useable for industrial or agricultural purposes.

It will be evident to the skilled person that after a period of operation of the DCC 16, during which the water used therein has been continuously recirculated, impurities picked up from the flue gas 10A will gradually accumulate in the recirculated water. It will therefore be necessary either continuously or periodically to replace some of the impure recirculating water with clean water. A convenient way to do this would be to bleed off in stream 20 an amount of water that is slightly in excess of the amount condensed out of the flue gas 14, and to make up the resulting water deficit by continuous injection of a correspondingly small flow of clean water into the top of the DCC 16. Such clean water would conveniently be the excess portion of the stream 20, after purification.

The initially cooled flue gas 10B is next passed to a second cooling stage comprising a gas cooler 24, which is a radiator type of heat exchanger, similar to the air inlet coolers used on gas turbine engines when the ambient air temperature is too high for efficient operation of the gas turbine. In this type of gas cooler, the coolant 26A, 26B passes through an array of heat exchange coils and there is no direct contact between the coolant and the gas stream 10B.

In the embodiment of the invention shown in FIG. 1, chiller 30 is a mechanical chiller. This mainly comprises a compressor that pumps a refrigerant, such as Freon®, ammonia, or carbon dioxide, around a closed circuit between gas cooler 24, where the coolant removes heat from the flue gas by evaporation, and a means of heat rejection 28 comprising a condenser, the whole therefore acting as a heat pump. The condenser will condense the coolant by rejecting heat to an environmental coolant, such as seawater or ambient air.

Alternatively, chiller 30 may be an absorption type of industrial chiller that is energised by heat from the power plant and acts to cool recirculated water or other coolant 26B that has been heated by the flue gas stream 10B. Again, heat gained by the absorption chiller from the heated coolant 26B must be rejected to the environment at 28 through a heat exchanger whose form will depend on the type of coolant used in the gas cooler 24 and the nature of the environmental coolant to which heat is rejected.

Using the above chiller arrangements, it is possible to cool the flue gas down to 5° C. in stream 10C ready for entry to the $CO_2$ absorber 34 after energisation by the booster fan 36.

The flue gas 10B, at a temperature of about 25° C. before entering the gas cooler 24, still contains a substantial amount of water vapour. It is therefore necessary to further reduce the amount of water in the flue gas stream 10B to a low level that will not affect the water balance in the $CO_2$ absorber/regenerator system 34/44. This is achieved in the gas cooler 24, because at 5° C., most of the water vapour in the flue gas 10B condenses out for removal as water stream 32. After little or no further treatment, water 32 will be potable, or useable for industrial or agricultural purposes.

The relatively dry (0.8% water content), cooled and energised flue gases 10D are passed through one or more $CO_2$ absorbers 34 operating at about atmospheric pressure, where the gaseous $CO_2$ in the flue gases is reacted with, and consequently absorbed by, an ammoniated solution or slurry. The $CO_2$-depleted flue gas stream 10E is passed for further processing before release to atmosphere, as described below. Meanwhile, the $CO_2$-rich ammonia solution 40A is pumped by pump 42 from the absorber vessel 34 to the $CO_2$ regeneration system 44, where it is heated to release the absorbed $CO_2$ as a relatively clean pressurised $CO_2$ gas stream 45 containing low concentrations of ammonia. After passing through the regeneration system 44, the $CO_2$-lean ammonia solution 40B is re-circulated to the $CO_2$ absorber 34 for further duty. Advantageously, but not essentially, the low concentrations of ammonia in the $CO_2$ gas stream 45 may be recovered by a water wash process in scrubber 46 and recycled to the regenerator 44. Thereafter, the cleaned $CO_2$ gas stream 47 can be cooled and further pressurised for storage and sequestration (not shown).

An advantageous aspect of the carbon capture system being described is the way in which at least some of the heat necessary to release the absorbed $CO_2$ from the ammoniated solution in the regeneration system 44 is supplied from the DCC 16. As mentioned previously, the cooling water stream 18B leaves the DCC 16 at a temperature of about 52° C. After the water 20 has been bled off, the remaining water stream 18C is passed through a heat exchanger 22 in the regeneration system 44, where it helps to liberate the $CO_2$ by heating the ammoniated solution. It may not be possible to supply all the heat that is required by the regeneration system 44 from the DCC 16, in which case a supplementary heater (not shown) will be required in regeneration system 44. After giving up a large proportion of its heat to the regeneration system, the water is now at about 35° C., and is recirculated to a dry cooling tower 48 as stream 18D for cooling to ambient temperature again before being re-used in DCC 16.

A dry cooling tower 48 is used in the embodiment of FIG. 1 because open cooling towers, which are normally used in power generation schemes, evaporate large amounts of water into the atmosphere. This would be undesirable in situations where water saving is important, and would tend to negate an object of this invention, which is to use power station flue gases to provide extra water in areas where it may be in short supply.

Returning now to the path of the flue gases after leaving the $CO_2$ absorber 34, the skilled person will realise that inevitably the flue gas stream 10E will have been contaminated by ammonia in the $CO_2$ absorber 34. In the embodiment of FIG. 1, this ammonia is removed in a two-stage process. Firstly, flue gas stream 10E, containing about 5000 parts per million (ppm) of $NH_3$, is passed through a water wash process in scrubber 48 to recover a large proportion of the ammonia, which is recycled to the absorber 34. This reduces the ammonia concentration to about 200 ppm in the flue gas stream 10F leaving scrubber 48. Secondly, flue gas stream 10F is passed through a sulphuric acid wash scrubber 50, which reduces the ammonia concentration to about 2 ppm in the flue gas stream 10G that leaves scrubber 50. By this stage in the system, the flue gas stream 10G has been sufficiently cleaned for release to atmosphere though a stack.

The acid wash is a stand-alone process that continually recirculates a relatively small amount of sulphuric acid from the bottom of the scrubber 50 to the top via a pump 52. In the scrubber, the sulphuric acid combines with the ammonia in the flue gases to form ammonium sulphate by the reaction $$H_2SO_4 + 2NH_3 = (NH_4)_2SO_4.$$

Because the amount and concentration of sulphuric acid circulating in the scrubber is appropriately controlled, the ammonium sulphate solution at the bottom of the scrubber is quite highly concentrated, containing up to 30% or 40% ammonium sulphate. As shown, this is bled off in stream 54 and is suitable for use as a fertiliser after minimal further processing. The sulphuric acid is of course gradually consumed in the acid wash process, so it is necessary to continually inject further amounts of it into the scrubber 52 via a make-up line 56. Loss of water by evaporation in scrubber 52 will be very low, because the flue gas 10F at entry to the scrubber has a temperature of only about 5° C. Hence, the clean flue gas 10G will also be at about 5° C., containing very little water vapour, and very little water make-up will be required to be injected into the scrubber 52 with the sulphuric acid.

Loss of ammonia from the system due to inefficiencies in ammonia recovery and its use in production of ammonium sulphate must of course be compensated for by injection (not shown) of make-up ammonia into the $CO_2$ absorber/regenerator stage 34/44.

A process may be envisaged in which the ammonia entrained in the flue gases during their passage through the absorber is removed by the sulphuric acid scrubber 50 alone. In this case, greater amounts of ammonium sulphate solution would be produced, requiring proportionally greater amounts of sulphuric acid in the scrubber 50, and increased sulphuric acid and ammonia make-up.

As already noted, cooling towers (whether dry or open) can only cool a fluid down to ambient temperature or slightly above, since they depend upon atmospheric air to obtain a cooling effect. Hence, in hot climates, where air temperatures may regularly exceed 35° C., the water stream 18D may be put into a heat exchange relationship with seawater, if it is locally available, rather than use a cooling tower.

A further alternative to dry cooling tower 48 could be another absorption-type chiller, energised by heat from the power plant, to cool the water 18D down to an acceptable temperature for use in the DCC 16. Again, this requires rejection of heat to the environment.

As an environmentally preferable alternative to the use of environmental coolants to cool water stream 18D, a dry cooling tower 48, or other suitable heat exchange arrangement, could be used to transfer heat from water stream 18D at about 35° C., to the clean flue gas stream 10G, which is initially at about 5° C., before the flue gas is exhausted to atmosphere. This is indicated on FIG. 1 by the dashed leftward extension of the arrow 10G. Such transfer of flue gas heat from an earlier stage in the process to the clean flue gas stream avoids the need to reject heat to environmental coolants such as seawater and enables more rapid dispersal of the clean flue gas in an exhaust plume. The plume may be invisible due to its low water vapour content.

The following features of the above described process should be particularly noted.

(a) The amount and purity of water that can be bled off from the process is maximised by;
using a GTCC power plant burning gasified coal (as opposed to other types of coal burning power plants) to ensure that the impurity content of the fuel gas stream 10 is minimised, so that after desulphurisation, the flue gas stream 10A entering the DCC 16 is sufficiently clean to facilitate an acceptably clean water bleed 20;
avoiding the prior art expedient of feeding back excess water from DCC 16 to the desulphurisation process 12—instead, lower-quality water such as seawater can be used in the desulphurisation process, thereby freeing relatively clean water for bleeding off in stream 20; and
using "zero evaporation" (no water loss) methods of cooling the water stream 18A and coolant stream 26A before their entry to the DCC 16 and the gas cooler 24, respectively.

(b) The invention maximises the amount of useful fertiliser product that is produced by the process. This is achieved by using the sulphuric acid wash 50 as a stand-alone stage at the end of the process, i.e., its only link with any previous stage or stages in the process is to receive flue gas stream 10F from an earlier process stage, its recirculating acid wash being isolated from previous process stages.

(c) The energy efficiency of the $CO_2$ removal process is increased and its environmental impact is reduced by:
the use of heat from the DCC 16 in the $CO_2$ regenerator;
the use of the chilled clean flue gas 10G to cool water before the water enters the DCC 16 and the corresponding heating of the clean flue gas to aid exhaust plume dispersal.

The present invention has been described above purely by way of example, and modifications can be made within the scope of the invention as claimed. Thus, the breadth and scope of the present invention should not be limited by any of the above-described exemplary embodiments. Each feature disclosed in the specification, including the claims and drawings, may be replaced by alternative features serving the same, equivalent or similar purposes, unless expressly stated otherwise.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. A process for removing $CO_2$ from combustion gas, comprising:
(a) cooling a $CO_2$-rich gas stream to below ambient temperature, said cooling being performed in a plurality of cooling stages;
(b) absorbing $CO_2$ from the cooled, $CO_2$-rich gas stream using a $CO_2$-lean ammonia solution, thereby creating a $CO_2$-lean gas stream and a $CO_2$-rich ammonia solution;
(c) heating the $CO_2$-rich ammonia solution to liberate $CO_2$ from the $CO_2$-rich ammonia solution, thereby providing the $CO_2$-lean ammonia solution for step (b); and
(d) heating the $CO_2$-lean gas stream using a fluid from step (a) improving the dispersal of the $CO_2$-lean gas stream into the atmosphere and cooling the fluid to produce a cooled fluid for use in step (a); wherein the cooled fluid is used to cool the $CO_2$-rich gas stream in step (a), thereby heating the cooled fluid to produce a heated fluid, wherein the heated fluid is used to heat the $CO_2$-rich ammonia solution in step (c).

2. The process of claim 1, wherein the cooled fluid cools the $CO_2$-rich gas stream in a direct contact cooler.

3. The process of claim 1, further comprising:
recovering an initial portion of entrained ammonia from the $CO_2$-lean flue gas stream by scrubbing the $CO_2$-lean flue gas stream in a water wash stage; and
recovering another portion of entrained ammonia from the $CO_2$-lean flue gas stream by scrubbing the $CO_2$-lean flue gas stream in an acid wash stage.

4. The process of claim 3, wherein the water wash stage precedes the acid wash stage in recovering entrained ammonia from the $CO_2$-lean flue gas stream.

5. The process of claim 3, wherein sulphuric acid is used in the acid wash stage, thereby providing concentrated ammonium sulphate by combination of the entrained ammonia with the sulphuric acid.

6. The process of claim 3, wherein step (b) is performed in at least one absorption stage, ammonia recovered in the water wash stage is provided to the absorption column, and ammonia recovered in the acid wash stage is removed from the process.

7. The process of claim 1, wherein the $CO_2$-rich flue gas originates from a gas turbine combined cycle power plant burning gasified coal or oil, and the method further comprises:
bleeding water from first and second flue gas cooling stages for use outside the process.

8. The process of claim 7, further comprising:
desulfurizing the $CO_2$-rich flue gas before step (a) using seawater.

9. The process of claim 8, wherein water is bled separately from the first and second flue gas cooling stages for use in different applications outside the process.

10. A process for removing $CO_2$ from combustion gas, comprising:
(a) cooling a $CO_2$-rich gas stream to below ambient temperature, said cooling being performed in a plurality of cooling stages;
(b) absorbing $CO_2$ from the cooled, $CO_2$-rich gas stream using a $CO_2$-lean ammonia solution, thereby creating a $CO_2$-lean gas stream and a $CO_2$-rich ammonia solution;
(c) heating the $CO_2$-rich ammonia solution to liberate $CO_2$ from the $CO_2$-rich ammonia solution, thereby providing the $CO_2$-lean ammonia solution for step (b); wherein heating the $CO_2$-rich ammonia solution to liberate $CO_2$ produces a cooled fluid for use in step (a) to cool the $CO_2$-rich gas stream, thereby heating the cooled fluid to produce a heated fluid used to heat the $CO_2$-rich ammonia solution in step (c);
(d) recovering an initial portion of entrained ammonia from the $CO_2$-lean flue gas stream by scrubbing the $CO_2$-lean flue gas stream in a water wash stage; and
(e) recovering another portion of entrained ammonia from the $CO_2$-lean flue gas stream by scrubbing the $CO_2$-lean flue gas stream in an acid wash stage.

11. The process of claim 10, wherein the water wash stage precedes the acid wash stage in recovering entrained ammonia from the $CO_2$-lean flue gas stream.

12. The process of claim 10, wherein sulphuric acid is used in the acid wash stage, thereby providing concentrated ammonium sulphate by combination of the entrained ammonia with the sulphuric acid.

13. The process of claim 10, wherein step (b) is performed in at least one absorption stage, ammonia recovered in the water wash stage is provided to the absorption column, and ammonia recovered in the acid wash stage is removed from the process.

* * * * *